United States Patent [19]

Suarez

[11] 4,388,037
[45] Jun. 14, 1983

[54] HOIST ACCESSORY FOR PALLET TRUCKS

[76] Inventor: Alfred Suarez, 3286 Woody La., San Jose, Calif. 95132

[21] Appl. No.: 231,604

[22] Filed: Feb. 5, 1981

[51] Int. Cl.$^3$ .............................................. B66F 9/19
[52] U.S. Cl. ................................ 414/607; 280/43.12; 414/496
[58] Field of Search ............... 414/496, 495, 486, 540, 414/541, 542, 543, 607, 608; 280/43.12

[56] References Cited

U.S. PATENT DOCUMENTS

| | | | |
|---|---|---|---|
| 2,386,759 | 10/1945 | Ulm | 414/607 |
| 3,026,089 | 3/1962 | Meister | 280/43.12 |
| 3,851,777 | 12/1974 | Dilny | 414/607 |
| 3,978,989 | 9/1976 | Avila | 414/543 X |

FOREIGN PATENT DOCUMENTS

| | | | |
|---|---|---|---|
| 257466 | 10/1967 | Austria | 414/608 |
| 2444580 | 4/1976 | Fed. Rep. of Germany | 414/607 |

Primary Examiner—Bruce H. Stoner, Jr.
Attorney, Agent, or Firm—Claude A. S. Hamrick

[57] ABSTRACT

A hoist accessory for pallet trucks including an adjustable lower bracket and base portion which rests upon the roots of the truck forks and clamps to the vertically extending riser portion thereof, a hoist, an upstanding vertical post and horizontally extending hoist support arm, and, an adjustable forward bracket and clamp for engaging a truck tongue extending forwardly of the top of the riser portion and providing rigid connection between the vertical post member and the truck tongue.

8 Claims, 3 Drawing Figures

HOIST ACCESSORY FOR PALLET TRUCKS

BACKGROUND OF THE INVENTION

1. Field of the Invention

The present invention relates generally to accessories for pallet trucks or hand trucks and more particularly toward a hoist apparatus which is adapted to be added to a standard pallet truck or the like to increase its utility.

2. Description of the Prior Art

Hand operated pallet trucks have long been used in shops, factories and warehouses to facilitate the moving of heavy objects which are loaded onto pallets. Such devices typically consist of a three wheeled carriage including a pair of load lifting forks extending away from a riser portion and having extendable wheels disposed proximate the tips thereof. A pivotable third wheel or wheel pair is affixed to the riser end of the truck immediately beneath a mechanical or hydraulic lifting mechanism. The lifting mechanism is handle actuated and causes the forks to be raised above a lowered position so as to lift a pallet or other load several inches above the floor.

Although numerous accessories are available for use with pallet trucks, heretofore no accessory has been provided which includes a hoist apparatus for permitting a heavy object to be lifted from the top and then wheeled about supported by the pallet truck. If such accessory were available, it would greatly extend the utility of a pallet truck.

SUMMARY OF THE PRESENT INVENTION

It is therefore an object of the present invention to provide a hoist accessory which is adapted for installation to the base portion of a commercially available pallet truck device.

Another object of the present invention is to provide an accessory of the type described which can be easily mounted and dismounted on any of a variety of pallet truck models.

Still another object of the present invention is to provide apparatus of the type described which when added to a standard pallet truck, provides a mobile hoist unit capable of lifting objects having weights approaching the weight carrying limit of the pallet truck itself.

Briefly, a preferred embodiment of the present invention includes an adjustable lower bracket and base portion which rests upon the roots of the truck forks and clamps to the vertically extending riser portion thereof, a hoist, an upstanding vertical post and horizontally extending hoist support arm, and, an adjustable forward bracket and clamp for engaging a truck tongue extending forwardly of the top of the riser portion and providing rigid connection between the vertical post member and the truck tongue.

An important advantage of the present invention is that it can be applied to many different sizes and models of standard hand trucks.

Another advantage of the present invention is that it can be easily attached and removed using simple, readily available tools.

Still another advantage of the present invention is that it substantially increases the utility of a standard pallet truck.

These and other objects and advantages of the present invention will no doubt become apparent to those having ordinary skill in the art after having read the following detailed description of a preferred embodiment illustrated in the several figures of the drawing.

IN THE DRAWING

DETAILED DESCRIPTION OF THE PREFERRED EMBODIMENT

Figure 1:
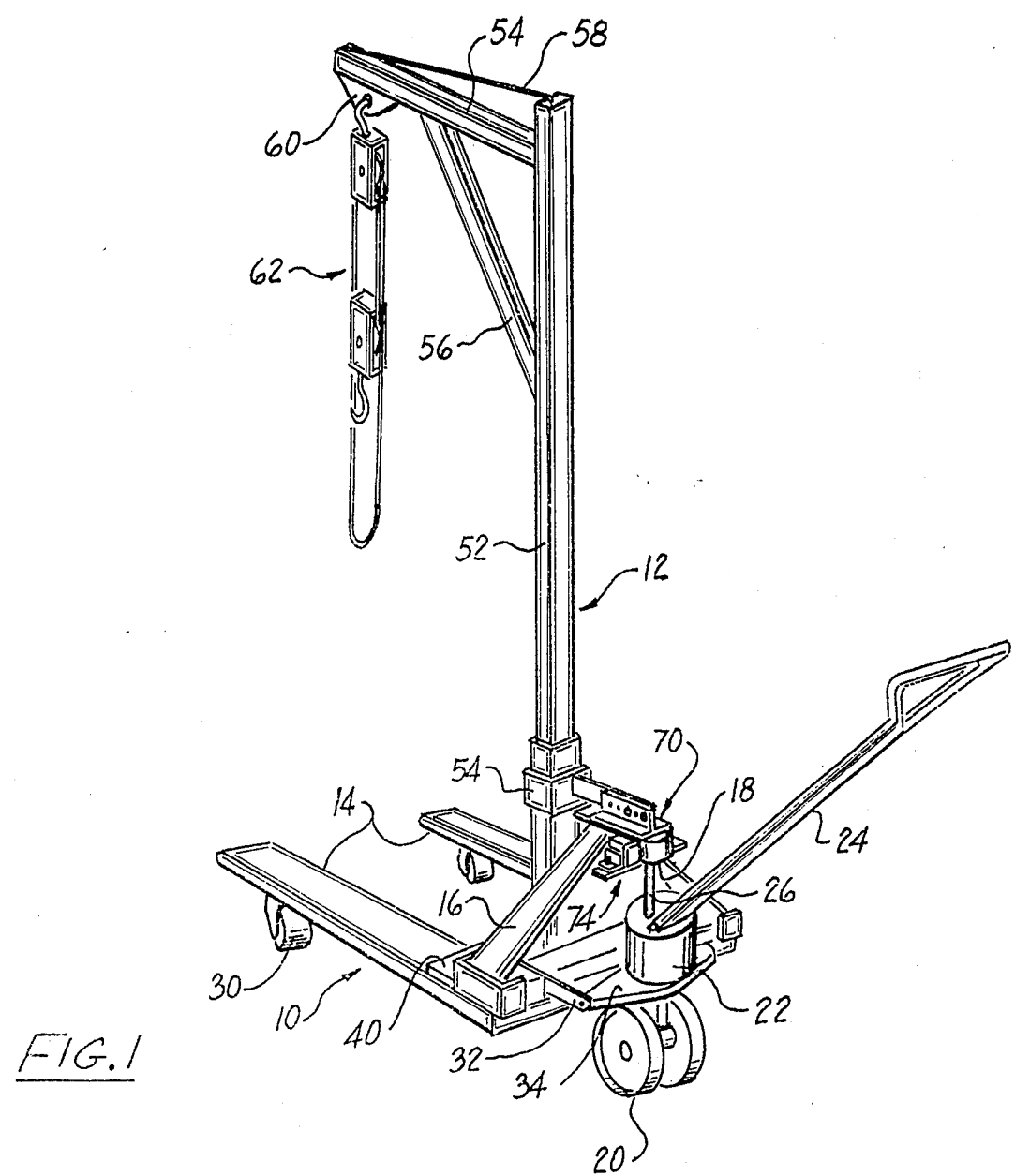
FIG. 1 is a perspective view showing a hoist accessory in accordance with the present invention mounted on a standard pallet truck.

Referring now to FIG. 1 of the drawing, a commercially available pallet truck is graphically illustrated at 10 having a hoist accessory 12 in accordance with the present invention mounted thereon. The pallet truck 10 includes a pair of forks 14 rigidly attached to an upstanding riser shroud 16 having a forwardly extending tongue portion 18. Mounted immediately in front of the shroud 16 and supported by a pair of nose wheels 20 is a hydraulic jack unit 22 which is actuated by means of a pivotally attached pull handle 24. A vertically extending lift cylinder 26 liftingly engages the tongue 18. Pivotally attached beneath each of the forks 14 are wheels 30 which are coupled to an actuating linkage including a lever arm partially visible at 32. The arm 32 is attached to a plate 34 supporting the jack 22 and is pivotally attached to shroud 16 such that when jack cylinder 26 is extended to raise tongue 18, the linkage including lever 32 causes wheels 30 to be deployed downwardly lifting the forks 14 by the same amount.

Figure 2:
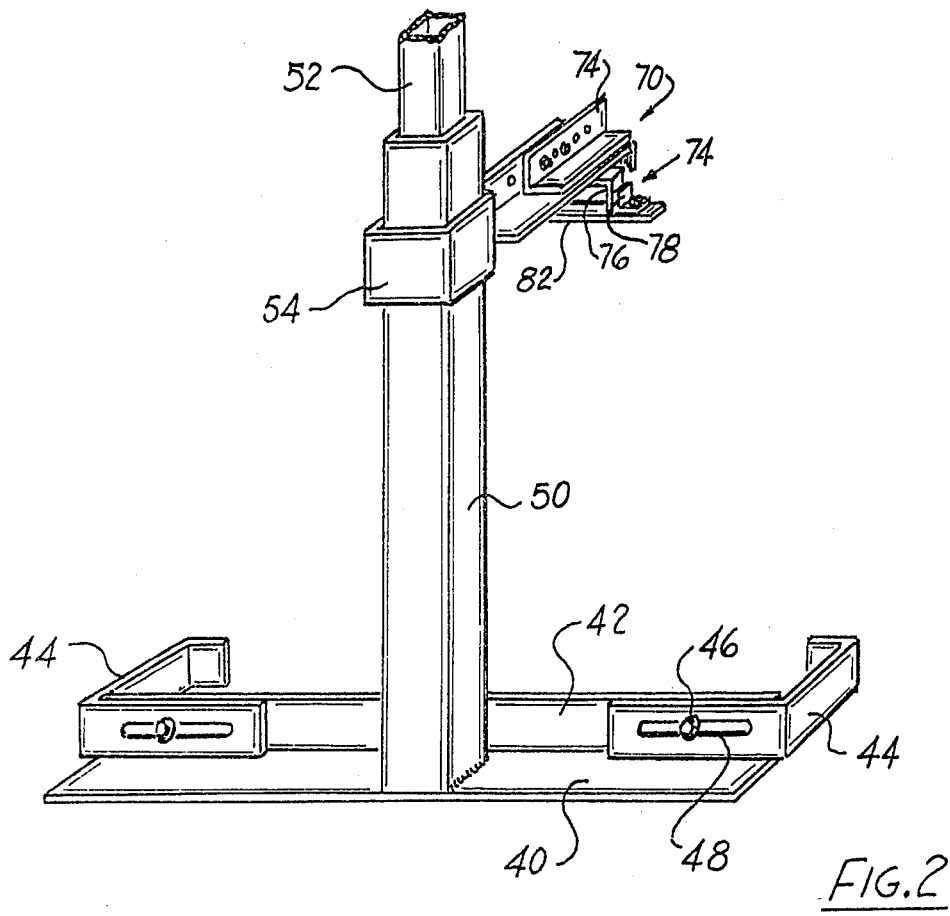
FIG. 2 is a perspective view illustrating in further detail the lower components of a hoist accessory in accordance with the present invention.

Hoist apparatus 12 is comprised of a base plate 40, more clearly depicted in FIG. 2 of the drawing, having an upstanding stiffening rib 42 formed along one edge thereof. At each end of base member 40 a generally L-shaped bracket 44 is attached to web 42 by means of at least one bolt 46 which extends through a hole in rib 42 and a slot 48 in bracket 44. Slot 48 accommodates adjustment of the brackets 44 so as to fit various widths of shroud 16. Attached to the mid-point of base 40, typically by welding, is a hollow post 50 which typically extends several inches higher than the highest expected rise of shroud 16. In the preferred embodiment, the post 50 extends 24 inches above base 40.

Telescopically received within post 50 is a vertical standard 52 having a horizontally extending arm 53 affixed proximate its upper end and an angle brace 56 connected therebetween to strengthen arm 53. Adding additional strength to the arm 53 is a rod or cable 58 which extends from its distal end to the upper end of standard 52. Alternatively, a rigid web could be welded to the top surface of arm 53. Affixed to the bottom side of the end of arm 53 is a suitable means 60 to which a hoist shown at 62 can be suspended.

Figure 3:
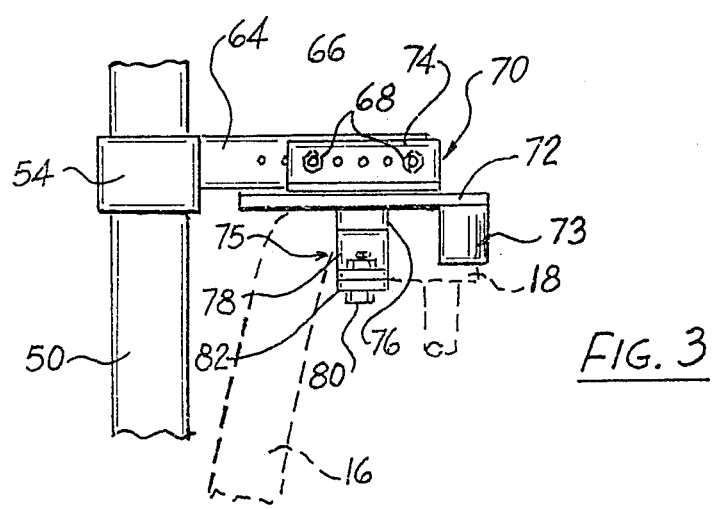
FIG. 3 is a partially broken side view further illustrating details of a hoist accessory in accordance with the present invention.

Referring now additionally to FIG. 3 of the drawing, it will be noted that the subject apparatus further includes a collar 54 disposed coaxially about post 50. Rigidly affixed to collar 54 is a forwardly extending arm 64 having regularly spaced apertures 66 provided therein. Affixed to tongue 64 by means of bolts 68 is a forward connection assembly 70 including a flat plate 72 adapted to rest directly upon the top of the truck tongue 18. Bracket 70 also includes an angle iron shaped attachment flange 74 welded to the upper surface of plate 72. Affixed to the front of plate 72 are curved nose pieces 73 which bear against the front of truck tongue 18 so as to prevent plate 72 from sliding rearwardly as loads are lifted by the hoist mechanism.

Welded to the lower surface of plate 72 is a clamping bracket 75 including a downwardly facing, generally U-shaped member 76 having outward extended flanges 78 welded thereto. Attached to the flanges 78 by means of suitable bolts 80 passed therethrough is a lower plate 82 which passes beneath the truck tongue 18 and is similarly secured to bracket 75 on the other side.

The apparatus can be mounted to a pallet truck by simply loosening the bolts 46 and removing the bolts 80 in bracket 75 and then positioning the device over the shroud 16 as indicated in FIG. 1. The brackets 44 are then positioned to snuggly engage the sides of the lower portion of shroud 16 and the bolts 46 are tightened. If the nose pieces 73 of plate 72 do not fit snuggly against the front end surface of truck tongue 18, then the bolts 68 may also be removed to allow proper alignment of bracket 74 relative to arm 64. Bolts 68 are then repositioned to secure bracket 70 to tongue 74. Thereafter, plate 82 is positioned beneath truck tongue 18 and the bolts 80 are installed so that bracket 75 locks the assembly 70 to tongue 18. Note that since collar 54 is telescopically received over post 50 and is not rigidly secured thereto, its height can be adjusted to accommodate variations of the heighth of the front shroud 16.

At this point, the device is firmly anchored to truck 10 and may be used to lift any load within its lifting capability. Note that installation of the hoist apparatus 12 to truck 10 does not restrict operation or use of the truck. To the contrary, it increases the utility of the truck by making it possible to lift and carry an object from the top as well as from the bottom.

Although the present invention has been described with respect to a particular embodiment, it will be appreciated that the invention may be embodied in other specific forms to accomplish the same function. It is therefore intended that the appended claims be interpreted as covering all such alterations and modifications as fall within the true spirit and scope of the invention.

What is claimed is:

1. Hoist accessory apparatus for pallet trucks and the like of the type having a pair of horizontally extending forks extending in one direction relative to an upstanding shroud and a tongue portion extending in the opposite direction relative to the shroud, comprising:
   means forming a base for resting upon the forks of a pallet truck and including clamping means for clamping the base to the shroud of the pallet truck;
   hoist means;
   support means affixed to said base and extending upwardly to support said hoist means above said forks; and
   fastening means for securing said support means to the forwardly extending tongue of the pallet truck, said fastening means acting in combination with said clamping means to rigidly secure said hoist apparatus to said pallet truck.

2. Hoist accessory apparatus as recited in claim 1 wherein said support means includes a first vertically extending post member rigidly affixed to said base and a second vertically extending post member telescopically mated with said first member and having a cantilevered arm member affixed to the upper end thereof and extending generally horizontal relative thereto, said arm member having said hoist means attached to an end portion thereof.

3. Hoist accessory apparatus as recited in claims 1 or 2 wherein said base includes a rigid, horizontally extending member adapted to rest upon the root end of said forks, said clamping means including hook-shaped brackets adjustably secured to each end of said base for clampingly engaging the sides of the shroud of said truck.

4. Hoist accessory apparatus as recited in claim 3 wherein said fastening means includes means slideably engaging said support means and having a horizontally extending arm, and means affixed to said arm for clampingly engaging the tongue of said pallet truck.

5. Hoist accessory apparatus as recited in claim 4 wherein said fastening means further includes adjustment means coupling said horizontally extending arm to said means for clampingly engaging the truck tongue and permitting adjustment of the positioning therebetween in the horizontal direction.

6. Hoist accessory apparatus as recited in claim 1 wherein said fastening means includes means slideably engaging said support means and having a horizontally extending arm, and means affixed to said arm for clampingly engaging the tongue of said pallet truck.

7. Hoist accessory apparatus as recited in claim 6 wherein said fastening means further includes adjustment means coupling said horizontally extending arm to said means for clampingly engaging the truck tongue and permitting adjustment of the positioning therebetween in the horizontal direction.

8. Hoist accessory apparatus as recited in claim 6 or 7 wherein said support means includes a first vertically extending post member rigidly affixed to said base and a second vertically extending post member telescopically mated with said first member and having a cantilevered arm member affixed to the upper end thereof and extending generally horizontal relative thereto, said arm member having said hoist means attached to an end portion thereof.

* * * * *